United States Patent Office 3,431,791
Patented Mar. 11, 1969

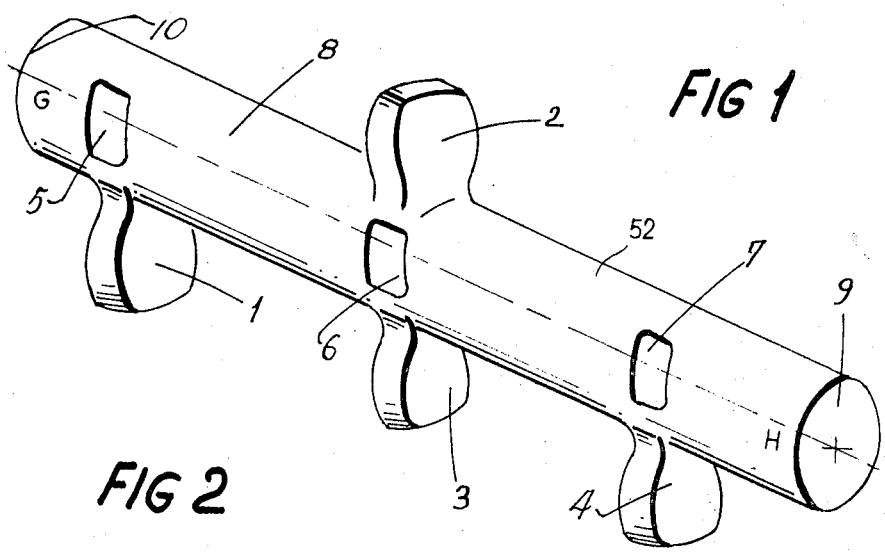
FIG 1
FIG 2
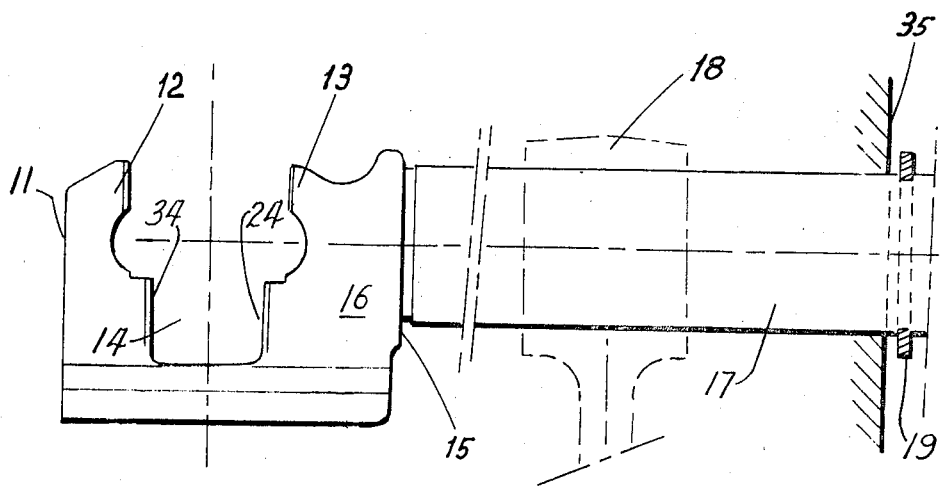
FIG 3
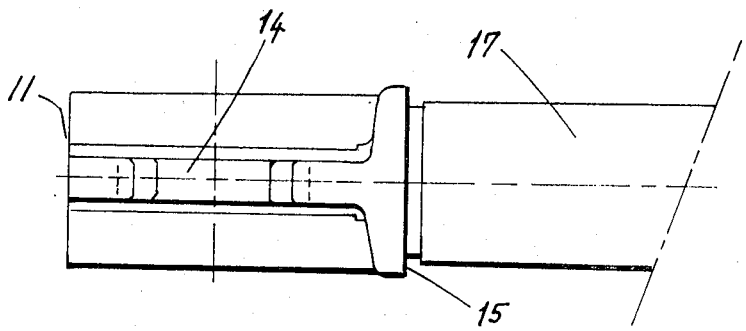

3,431,791
GEAR SELECTOR AND CONTROL DEVICE FOR TRANSMISSION MECHANISMS
Pierre Labat, Suresnes, France, assignor to Societe Anonyme de Vehicules Industriels et d'Equipments Mecaniques Saviem, Suresnes, France
Filed Feb. 13, 1967, Ser. No. 615,726
Claims priority, application France, Feb. 16, 1966, 49,886
U.S. Cl. 74—473
Int. Cl. G05g 9/08
7 Claims

ABSTRACT OF THE DISCLOSURE

A selector and control device for shifting gears on an automotive vehicle or the like, comprising in a gear case a sliding and rotating selector member having a cylindrical body carrying integral cam means associated with sliding shafts rigid at one end with links forming a pair of slideways associated with said cams and having horns for the selector body's guiding and for locking of nonselected speeds, said selector being adapted by movements of translation to select the desired sliding shaft and by movements of rotation to shift the shaft.

---

This invention relates to the devices for selecting and controlling gears in a transmission mechanism and is intended more particularly for equipping the transmission or change-speed mechanism of an automotive vehicle or the like, this device being characterised essentially in that it comprises a gear selector constituting an integral or unitary member adapted to co-act with the sliding shafts and adapted to perform all the functions and movements necessary for selecting and changing speeds.

Other features of this invention will appear as the following description proceeds with reference to the accompanying drawings illustrating diagrammatically by way of example a typical form of embodiment of the device constituting the subject-matter thereof. In the drawings:

FIGURE 1 is a perspective view of the selector device;

FIGURE 2 is an elevational view showing a sliding shaft with a link rigid therewith;

FIGURE 3 is a plan view of this sliding shaft;

It is obvious that although the following description refers to the application of this invention to a transmission mechanism, the same device is also applicable to the control of other types of machine components.

Figure 10:
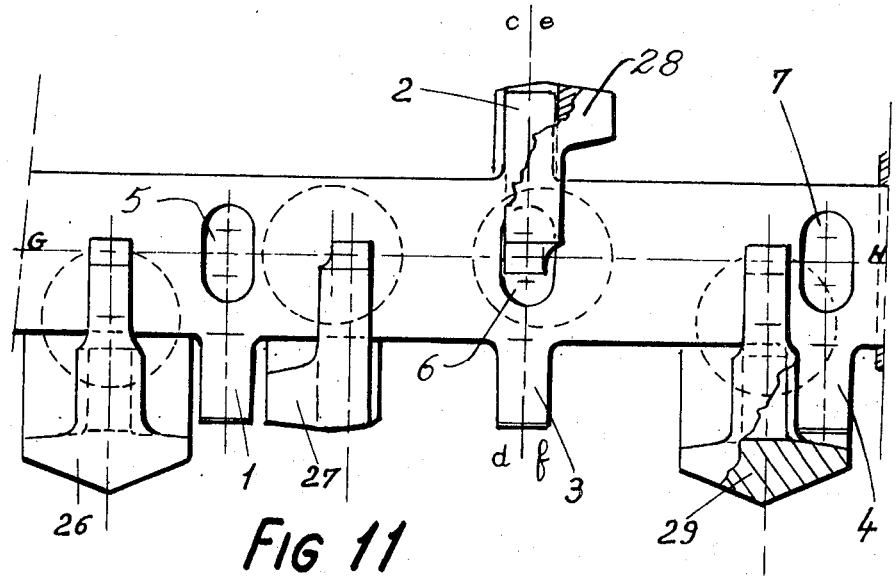
FIGURE 10 is an eleveational view of a selector mechanism equipped with the device of this invention.
Figure 11:
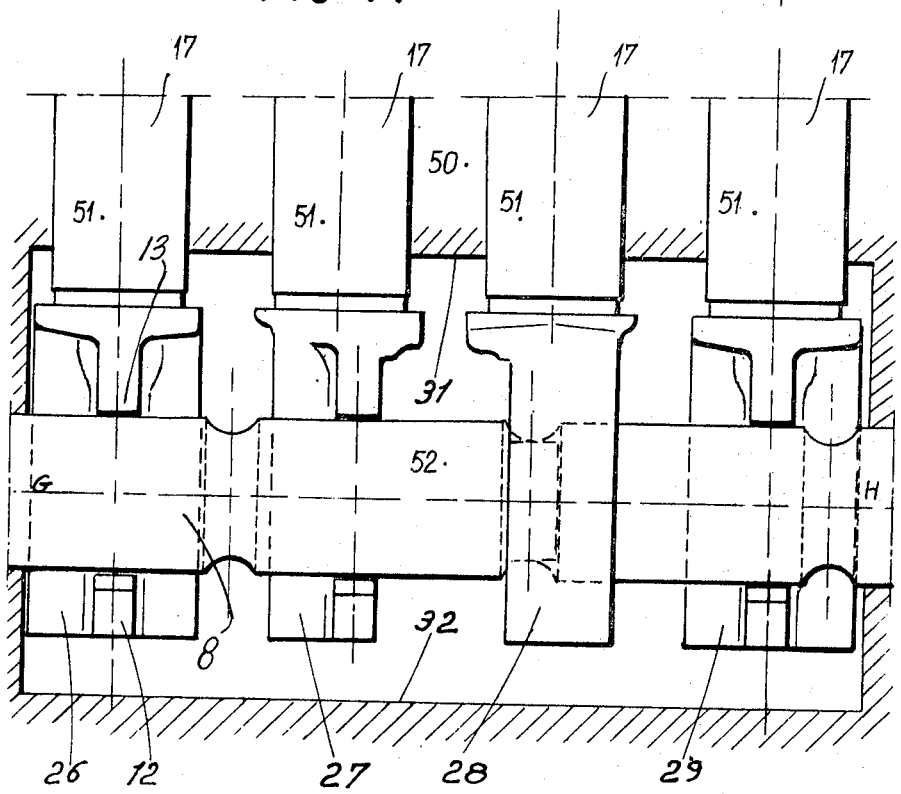
FIGURE 11 is a plan view of the assembly shown in FIGURE 10.

Referring first to FIGURES 10 and 11 of the drawings it will be seen that the selector and control device according to this invention comprises a case 50 having slidably mounted therein the bodies 17 of sliding shafts 51 which correspond to the slideways of a gear selector and change grid, and wherein the cylindrical body 8 of a selector member 52 is also adapted to slide and rotate about an axis GH (FIGURE 1).

Formed integrally with this cylindrical body 8 are a suitable number of cams 1 to 4 either separate from each other or grouped by diametrically opposite pairs such as cams 2 and 3 of the drawings, all these cams being coplanar with transverse through apertures 5, 6 and 7 formed in the selector member. Moreover, the selector is provided at its ends 10 and 9 with means (not shown) for controlling its movement of translation and rotation, and a device (not shown) for detent-positioning the selector member with respect to the mechanisms through which the selected gear is to be engaged.

Figure 7:
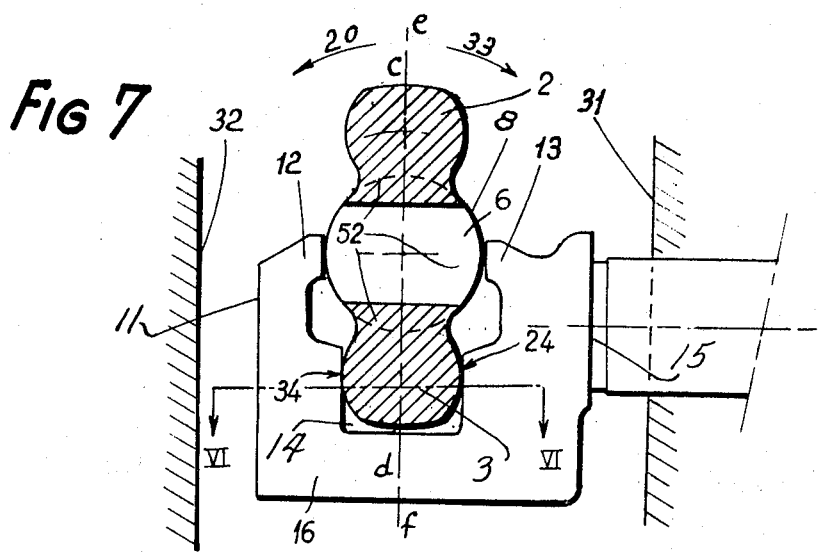
FIGURES 7, 8 and 9 are diagrammatical sectional views showing the different positions assumed by a single cam of the selector device in its companion link.
Figure 8:
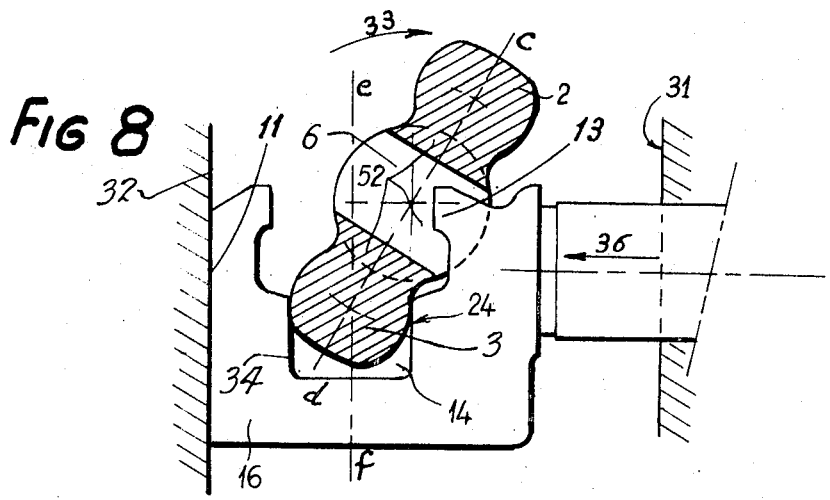
Figure 9:
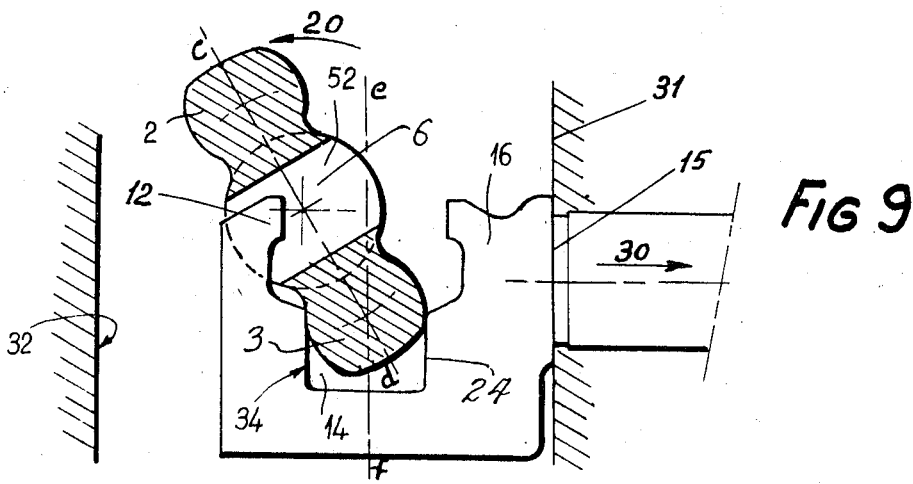

On the other hand, each sliding shaft adapted to actuate a fork 18 for engaging one or two speeds has formed at one end (see FIGURES 2 and 3) an integral link 16 comprising a shoulder 15 on its inner end, and a free outer face 11 for limiting the permissible movement of translation of this link 16 between two walls 31 and 32 of the gear case 50 (see FIGURES 7, 8 and 9). The end faces of a recess 14 formed in the link constitute a pair of slideways 24 and 34. A pair of registering horns 12 and 13 provide the locking functions useful to the device along the slideways. The opposite end of the sliding shaft may be provided with retaining or abutment means such as a circlips or spring ring 19 adapted, by engaging a fixed member such as one of the faces 35 of the gear case 50, to limit the permissable axial stroke of this sliding shaft so as to restrict to a single gear the action of the selector normally designed for controlling two gears (one at a time, of course).

A cam 1 or 4 is adapted to control the movement of the sliding shaft by reacting against either of said slideways 24 or 34 of a link 16, the horns 12 and 13 of the other sliding shafts being adapted in this case to lock the non-selected gears in their neutral positions. Moreover, one or the other of these two horns is adapted to hold the selector against any movement of translation when one gear is engaged, by penetrating into the aperture registering with the engaged cam.

Figure 4:
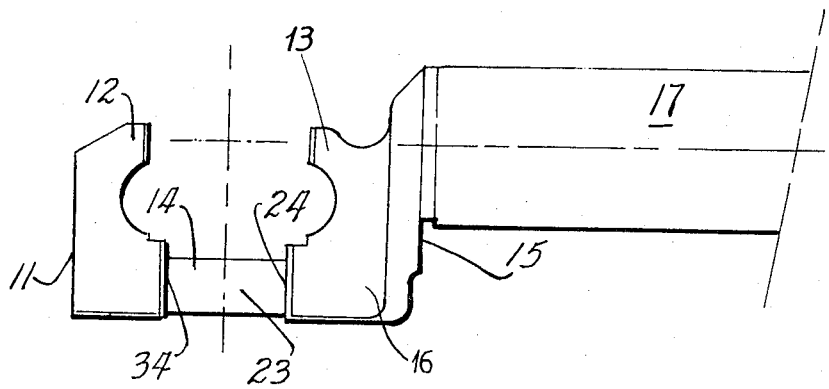
FIGURE 4 illustrates in elevational view a modified form of embodiment of the member shown in FIGURE 2.
Figure 5:
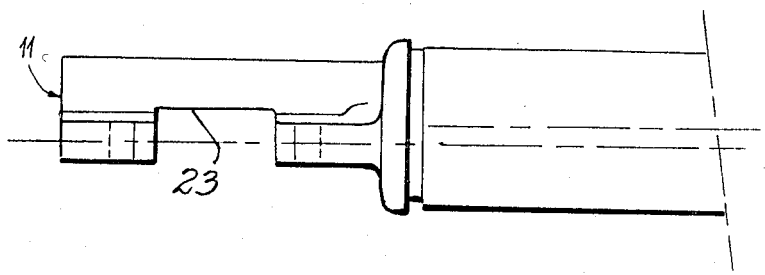
FIGURE 5 is a plan view of the member shown in FIGURE 4.

FIGURES 4 and 5 illustrate a link 16 comprising basic elements common with those of the form of embodiment shown in FIGURES 2 and 3. Therefore, the same reference numerals (11, 12, 13, 14, 15, 16, 17, 24 and 34) are used for designating similar elements in these figures. By acting as an abutment member, this link 16 is adapted to position the selector of the FIGURE 1 in the lateral position during the selection of its link 16. To this end, the slideways 24 and 34 are interconnected by a wall 23 adapted to stop one of the cams 1, 2, 3 or 4 of the selector, the selector cam 2 being in contact with, say, the link 28 (see FIGURES 10 and 11). Finally, the symmetrical disposal of the selector cams 1, 2, 3 and 4 with respect to an axis cd (FIGURES 7, 8 and 9), and also of the slideways 24, 34 and horns 12 or 13 with respect to an axis ef, are also to be noted in this construction.

Now reference will be made to FIGURES 7, 8 and 9, showing the typical positions of the selector when one of the cams thereof, for example cam 3, is engaged in a recess 14 of one of the links 16, for explaining the operation of the device.

When the selector is in its neutral or inoperative position (FIGURE 7) the "Neutral" position is obtained for all the sliding shafts 26, 27, 28 and 29 (FIGURE 11), the axes or center lines cd and cf of the cams and link being aligned, and the center line cd of cam 3 is merged into the center line ef of the slideways and horns of link 16. The horns 12 and 13 of all the non-selected links contact the cylindrical body 8 of the selector (see FIGURE 11) and permit the lateral displacements thereof along its axis GH as controlled by the aforesaid actuators (not shown). The selector may be positioned in the lateral direction either by the adequate means already mentioned hereinabove but not illustrated in the drawings (the sliding shaft links 16 being of the type illustarted in FIGURES 2 and 3), or by the abutment of a cam such as 2 against the link of a sliding shaft of the type shown in FIGURES 4 and 5, for example at 28 (FIGURES 10 and 11).

It will be noted that during the movement of translation of selector 52 for shifting from one sliding shaft to another, the horns 12 and 13 of links 16 move for example past the apertures 5, 6 or 7. During this movement, these horns are no longer holding the neutral position and at this time it is the cam 3 (registering with the aperture 6) that guides the selector 52 and holds it in the proper angular position, since this cam engages the recess 14 of the link at the same time.

Figure 6:
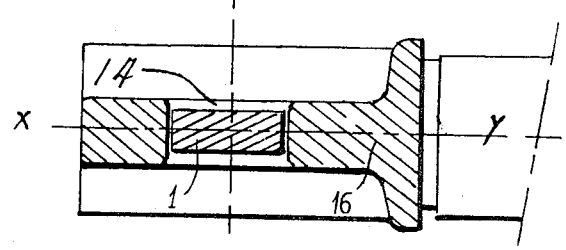
FIGURE 6 is a section taken upon the line VI—VI of FIGURE 7.

As shown in FIGURE 6, it is also possible to have a difference in thickness between the link 16 and the cams 1, 2, 3 and 4 to provide a certain overlap facilitating the guiding relay action.

When a sliding shaft has been selected by translation, it is only necessary to rotate the selector about its axis as shown by the arrow 33 (FIGURE 8) for causing on the one hand the movement of the selected sliding shaft in the direction of the arrow 36 and the engagement of one of the sliding shaft speeds by means of the cam 3 reacting against the sliding face 34 of link 16, and on the other hand locking the selector against lateral movement by means of the horn 13 engaging the aperture 6 as a consequence of the movement of rotation. The angular value of this movement of rotation is limited by the abutment of the end face 11 of link 16 (see FIGURES 2, 3, 4, 5 and 6) against the face 32 of the gear case.

It will be noted that when the desired gear has been selected all the other gears are locked in the irrelevant neutral position by means of the selector body 8 guiding and positioning the horns 12 and 13 of the corresponding links. Moreover, the control grid or disposal of the device is such that only one gear can be engaged at a time, and to this end there is only one aperture and one cam that can be moved simultaneously in their operative position (3 and 6) in this case (see FIGURES 7 and 8).

If the selector 8 is rotated in the direction of the arrow 20 (FIGURE 9), the cam 3 will react against the link slideway 24, thus moving the sliding shaft in the direction of the arrow 30 and engaging the other speed of this sliding shaft. The shoulder 15 of link 16 restricts the value of this rotational movement by abutting against the other face 31 of gear case 50, the selector being locked in the lateral direction by means of a horn 12 engaging the aperture 6.

In the form of embodiment illustrated in FIGURES 10 and 11 of the drawings it will be seen that the position of one of the links 28 is opposed to the positions of the other three (26, 27 and 29) on the selector body 8. These two positions are symmetrical relative to a median axial plane of the selector body. Of course, it would also be possible to position a plurality of other links in the same manner and this evidences this very important feature of the device of this invention, that is, affording on the one hand a great number of combinations according to design requirements, and on the other hand the possibility of altering the gear positions on the grid.

To sum up, and according to the above description, it will be seen, on the one hand, that the selector is capable of performing the following functions:

(a) It is movable longitudinally relative to its axis, under the action of control members (not shown);

(b) During this movement, it can be positioned on the selected gate or sliding shaft either by abutment of one of its cams against the link to be actuated, or by a positioning device, these two methods being adapted to be used separately or in combination;

(c) The selected gear can be engaged by rotating the selector member about its axis by means of the control member (not shown);

(d) When the selected gear has been engaged, the selector member is locked in its axial position by causing one horn of the link to penetrate into the relevant aperture;

(e) The non-selected gears are also locked very accurately in the neutral position by this selector, the link horns being guided by the cylindrical portion of the selector members;

(f) During the gear selection, the selector cams take the relay of the guiding action to maintain the neutral position.

On the other hand, the link and its sliding shaft are adapted, under the control of the selector member, to (a) Control two speeds on the same sliding shaft;

(b) Control only one speed per sliding shaft, by adding an additional abutment member 19 on the sliding shaft;

(c) Be mounted on either side of the selector, according to design requirements;

(d) Act as lateral abutment means to the selector in the positioning of certain speeds;

(e) Lock all the speeds (except the selected one) in neutral position, and of course lock all these speeds in neutral according to requirements;

(f) Cause, during the general shifting to neutral, the movement of the link horns past the apertures of the selector member;

(g) Act as a means for limiting the longitudinal movement of the sliding shaft by means of the two opposite faces of the link which engage respectively the gear case 50.

Of course, the specific form of embodiment shown and described herein should not be construed as limiting the present invention since many modifications may be brought thereto without departing from the spirit and scope of the invention.

Thus, various gear selection and gear-shift combinations or gates may be contemplated from the same basic elements, or a plurality of speeds can be controlled by means of the same sliding shaft.

Besides, the number of cams is not subordinate to a predetermined number of sliding shafts.

I claim:

1. A selector and control device for shifting gears on an automotive vehicle or the like comprising, in a gear case, a selector member movable both axially and rotationally about its axis, a plurality of control cam means integral with said member, a plurality of sliding shafts normal to said member and adapted to be acted upon by said cam means for selection and shifting of said shafts to the selected speed, said selector member being a substantially cylindrical body of unitary structure and having transverse apertures each of which is co-planar with a control cam, link means rigidly formed on one end of each of said sliding shafts, each said link having a recess therein forming a pair of slideways for said control cams, and horns formed on each said link and guided by said selector body for locking the non-selected shafts in a neutral position, one of said link horns of the selected sliding shaft engaging an aperture in said selector member which is in register with the control cam whereby the speed selection is effected for locking the selected speed.

2. A device according to claim 1, wherein said links act as lateral abutment means to the selector member in conjunction with a detent-positioning device.

3. A device according to claim 1, wherein all of the links are adapted, in conjunction with the cams of the selector member, to exert a guiding relay action in the neutral position.

4. A device according to claim 1, wherein the axial end faces of said links are adapted to act as abutment means by engaging the gear case for limiting the movements of translation of the sliding shafts.

5. A device according to claim 1, wherein a stop member is mounted in the sliding shaft for limiting its use to the control of a single speed.

6. A device according to claim 1, wherein each sliding shaft is adapted alternately to cause the engagement of two speeds by means of rotating said selector member and a corresponding cam engaging said sliding shaft link to a translation movement.

7. A device according to claim 1, wherein the links of said sliding shafts are disposed in at least one of two positions located symmetrically relative to an axial median plane of the selector member body.

References Cited

UNITED STATES PATENTS

| | | | |
|---|---|---|---|
| 1,248,817 | 12/1917 | Cross | 74—477 XR |
| 1,998,513 | 4/1935 | Manville | 74—475 |
| 2,021,404 | 11/1935 | Church | 74—473 XR |
| 3,053,102 | 9/1962 | Alfieri | 74—473 XR |

HALL C. COE, *Primary Examiner.*

U.S. Cl. X.R.

74—475, 477